P. EIBIG.
BEARING FOR ELECTRIC METERS.
APPLICATION FILED JULY 1, 1910.
1,104,176.
Patented July 21, 1914.
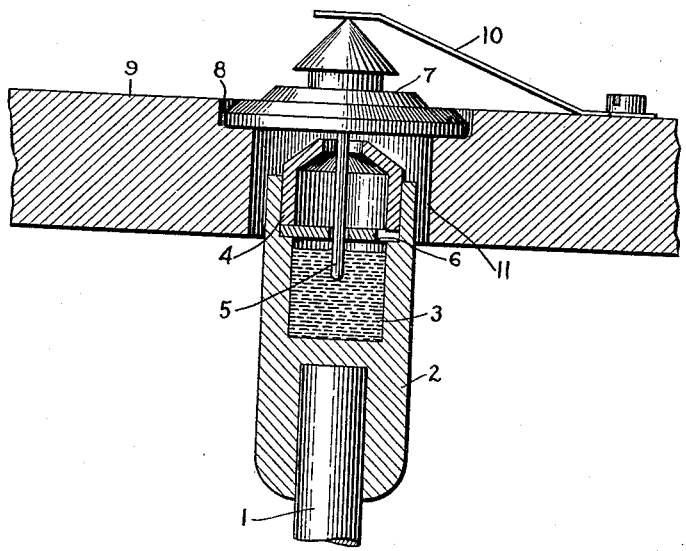
Witnesses:
Irving E. Steers.
J. Ellis Glen.
Inventor
Paul Eibig,
by Albert G. Davis
His Attorney.

UNITED STATES PATENT OFFICE.

PAUL EIBIG, OF NIEDER-SCHÖNHAUSEN, GERMANY, ASSIGNOR TO GENERAL ELECTRIC COMPANY, A CORPORATION OF NEW YORK.

BEARING FOR ELECTRIC METERS.

1,104,176.   Specification of Letters Patent.   Patented July 21, 1914.

Application filed July 1, 1910. Serial No. 569,871.

*To all whom it may concern:*

Be it known that I, PAUL EIBIG, a subject of the Emperor of Germany, residing at Nieder-Schönhausen, Germany, have invented certain new and useful Improvements in Bearings for Electric Meters, of which the following is a specification.

My invention relates to bearings for electric meters and has for its object an improvement in such devices.

Bearings for electric meters and other delicate instruments must be made as small and as frictionless as possible. This applies especially to the upper bearings of such instruments, since the weight of the rotating element is sustained by the lower bearing and the upper bearing is merely used to keep the rotating element in its proper position. Such bearings have been constructed by making the meter shaft with a hollow chamber at the upper end. Into this chamber, which may be filled with oil, extends a stationary pivot which bears against a suitable plate or other device affixed to the meter shaft. The upper end of this pivot is rigidly held by any suitable means. Such bearings are shown in German Patents Nos. 129,363 and 160,393, and my invention has for its object an improvement in these devices, whereby the pivot may be made extremely thin, to reduce the bearing friction to a minimum, and yet be able to sustain without injury any shock to which the meter may be exposed, and thus insure a safe transport of the instrument. I accomplish the object of my invention by providing the pivot with an elastic support so that for a vertical or horizontal movement of the shaft the pivot may have a corresponding movement and thus all danger of its bending or breaking is removed.

For a further understanding of my invention, reference may be had to the accompanying drawing which is a vertical view partly in section, and on a large scale, of my improved form of bearing, the upper portion only of the meter shaft being shown, as my invention may be applied to any form of meter.

1 is a rotatable shaft which has fastened to its upper end a member 2 in which is a chamber 3 containing oil. Inclosing this chamber at its upper end is a dust-tight shell 4. Extending through the shell and into the chamber, and substantially co-axial with the shaft, is a pivot pin 5 which is so arranged that it enters the oil in the chamber. Attached to member 2 is a plate 6 which surrounds the pivot and bears against it in the well-known manner, and thus forms a bearing surface for the upper end of the shaft that is almost frictionless. Attached to the upper end of the pivot is a head 7 which fits into a recess 8 formed in the stationary member 9. This head and the pivot are normally held stationary by the spring 10, one end of which is fastened to the stationary member 9. Member 9 is shown as formed with a hole or recess 11 surrounding a portion of member 2.

The pivot under normal conditions will be held as shown, but if for any reason the shaft is given a horizontal movement, due to shock or any other cause, the head 7 is capable of tipping up on one edge until member 2 rests against the stationary member 9. The shaft will then be fixed in position and all possibilities of injury or breakage to the pivot will be avoided. For a vertical movement of the shaft the entire head 7 will lift up, thus also preventing injuries to the pivot.

While I have described a preferred embodiment of my invention, I do not limit myself to this embodiment, but aim in the appended claims to cover all embodiments which will be obvious to those skilled in the art and which are within the scope of my invention.

What I claim as new and desire to secure by Letters Patent of the United States, is,—

1. An upper bearing for an electric meter comprising in combination a rotatable member having a chamber in its upper end, a stationary member having a recess surrounding said chamber, a pivot pin extending into said chamber and normally holding the rotatable member out of engagement with the stationary member, and a spring support for the pivot pin arranged to permit a movement of the pivot pin, such movement being limited by the engagement of the rotatable member with the stationary member.

2. An upper bearing for an electric meter comprising in combination a rotatable shaft, an oil containing chamber at the upper end of said shaft, a stationary member having a recess surrounding the wall of said chamber, a pivot pin substantially co-axial with said shaft and extending into said chamber and normally holding the wall of the chamber out of engagement with the stationary member, and an elastic support for the pivot pin arranged to permit a movement of the pivot pin, such movement being limited by the engagement of the wall of the chamber with the stationary member.

3. An upper bearing for an electric meter comprising in combination a rotatable member, an oil containing chamber at the upper end of said member, a stationary support having a recess surrounding the wall of said chamber, a head resting on the stationary support, a pivot pin secured to said head and extending into said chamber and normally holding the chamber out of engagement with the support, and elastic means for maintaining the head on the support.

In witness whereof, I have hereunto set my hand this 14th day of June, 1910.

PAUL EIBIG.

Witnesses:
WOLDEMAR HAUPT,
HENRY HASPER.

---

Copies of this patent may be obtained for five cents each, by addressing the "Commissioner of Patents, Washington, D. C."